United States Patent
Narayanan

(10) Patent No.: US 11,100,108 B2
(45) Date of Patent: Aug. 24, 2021

(54) INFLATIONARY SEGMENT APPROACH TO TEMPORAL DATA PARTITIONING FOR OPTIMIZED MODEL SCORING

(71) Applicant: International Business Machines Corporation, Armonk, NY (US)

(72) Inventor: Madhusudanan Narayanan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 15/485,279

(22) Filed: Apr. 12, 2017

(65) Prior Publication Data

US 2018/0300372 A1    Oct. 18, 2018

(51) Int. Cl.
*G06F 16/30* (2019.01)
*G06F 16/2455* (2019.01)
*G06F 16/2458* (2019.01)

(52) U.S. Cl.
CPC .... *G06F 16/24554* (2019.01); *G06F 16/2477* (2019.01); *G06F 16/24568* (2019.01)

(58) Field of Classification Search
None
See application file for complete search history.

(56) References Cited

U.S. PATENT DOCUMENTS

| 7,016,797 | B2 | 3/2006 | Takeuchi et al. | |
| 8,458,310 | B1* | 6/2013 | Mayor | H04L 67/34 |
| | | | | 709/203 |
| 9,681,185 | B2* | 6/2017 | South | H04N 21/44213 |
| 2006/0015535 | A1* | 1/2006 | Buchsbaum | G06F 9/542 |
| 2011/0220410 | A1* | 9/2011 | Aldred | E21B 44/00 |
| | | | | 175/26 |
| 2014/0222653 | A1 | 8/2014 | Takayasu et al. | |
| 2015/0247396 | A1* | 9/2015 | Tunc | E21B 44/00 |
| | | | | 700/275 |
| 2016/0292196 | A1* | 10/2016 | Yan | G06Q 30/0246 |
| 2017/0223083 | A1* | 8/2017 | Maze | H04N 21/234327 |

OTHER PUBLICATIONS

Killick, Rebecca et al., Changepoint: An R Package for Changepoint Analysis, Journal of Statistical Software, Jun. 2014, vol. 58, Issue 3, http://www.jstatsoft.org/v58/i03/paper/, 19 pages.

(Continued)

*Primary Examiner* — Thu N Nguyen
(74) *Attorney, Agent, or Firm* — Nicholas A. Welling; Christopher M. Pignato

(57) ABSTRACT

A method for segmenting a data series, including the steps of: receiving a data series comprising a plurality of change points; analyzing, by a processor, the received data series sequentially, comprising the steps of: (i) identifying a first change point in the data series; (ii) automatically assigning the identified first change point as a starting point for a first data segment; (iii) identifying, using only the data in the first data segment, a second change point in the data series; and (iv) automatically assigning the identified second change point as a starting point for a second data segment; and storing, in a database, the first and second identified change points, and the first and second data segments.

16 Claims, 4 Drawing Sheets

(56) References Cited

OTHER PUBLICATIONS

Killick, R. et al., Optimal detection of changepoints with a linear computational cost, Oct. 10, 2012, http://arxiv.org/pdf/1101.1438.pdf, 25 pages.
Ritchey, Tom, General Morphological Analysis, A general method for non-quantified modelling, Swedish Morphological Society 1998 (revised 2013) http://www.swemorph.com/ma.html, 10 pages.

* cited by examiner

INFLATIONARY SEGMENT APPROACH TO TEMPORAL DATA PARTITIONING FOR OPTIMIZED MODEL SCORING

BACKGROUND

The present invention is directed to methods and systems for data partitioning by using a detected changepoint as a starting point for future segments, and chunking the data contained between each detected changepoint.

Changepoint detection is the identification of an abrupt change in one or more parameters of an otherwise substantially stationary process. In a data series, for example, the identified changepoints can be utilized to identify segments formed from that data series. Changepoint detection and data segmentation has become increasingly important as the length of analyzed data series grows.

Current tools and methods for changepoint detection typically recalculate patterns using all data from the start of the data series or stream, and/or use a significant amount of the total available data. However, this has several important limitations. For example, since the identification of changepoints is based at least in part on the data series itself, identification of changepoints within a data series can be significantly influenced by the accumulating data. As a result, changepoint identification may vary considerably over the course of a data series. Although this may be suitable for some applications, other applications may require consistency in historically detected changepoints to take useful, actionable decisions based on the output or for the purpose of historical recording and tracking. Indeed, the data between two changepoints can vary significantly from averaged data across an entire data series or stream, thereby significantly complicating the identification of individual changepoints and subsequent segmentation of that data.

Additionally, when traditional methods are used to analyze a data series or stream to identify changepoints, the entire data series or stream is analyzed in its entirety, rather than just a single partitioned segment. As a result, the system operates slowly, and the speed decreases as the volume of data increases.

Accordingly, there is a continued need in the art for systems and methods that partition data into segments that are historically consistent as data accumulates, while enabling the use of each identified changepoint as the starting point for a next segment.

SUMMARY

The disclosure is directed to inventive methods and systems for detecting singular changes in a data series or stream, and using the detected changes as a starting point for data segmentation and identification of future changes. Under the present invention, a data segmentation system is enabled to detect a changepoint in a data series or stream, and utilizes that changepoint as the starting point for a subsequent segment of the data series or stream. Each new changepoint triggers a new segmentation of the data series or stream, without having to re-analyze data prior to the new changepoint. According to an embodiment, the system chunks the data to build the data set from the identified changepoint, until the system identifies the next changepoint. In one embodiment, the system uses the method to identify changepoints in a temporal data series or stream for optimized model scoring.

According to an aspect is a method for segmenting data. The method includes the steps of: receiving a data series comprising a plurality of changepoints; analyzing, by a processor, the received data series sequentially, comprising the steps of: (i) identifying a first changepoint in the data series; (ii) automatically assigning the identified first changepoint as a starting point for a first data segment; (iii) identifying, using only the data in the first data segment, a second changepoint in the data series; and (iv) automatically assigning the identified second change point as a starting point for a second data segment; and storing, in a database, the first and second identified change points, and the first and second data segments.

According to an embodiment, the method further includes the step of chunking the data in each of the first and second data segments.

According to an embodiment, the first changepoint is the start of the received data series.

According to an embodiment, the method further includes the step of receiving, from a user, a parameter for changepoint identification.

According to an embodiment, the method further includes the step of communicating the first and second identified change points, and the first and second data segments, to a user.

According to an aspect is a computer system configured to segment a data series. The system includes: a processor configured to: (i) identify a first change point in the data series; (ii) automatically assign the identified first change point as a starting point for a first data segment; (iii) identify, using only the data in the first data segment, a second change point in the data series; and (iv) automatically assign the identified second change point as a starting point for a second data segment; and a database configured to store the first and second identified change points, and the first and second data segments.

According to an embodiment, the system further includes a user interface configured to communicate the first and second identified change points, and the first and second data segments, to a user.

According to an aspect is a computer program product for segmenting a data series, the computer program product comprising a computer readable storage medium having program instructions embodied therewith, wherein the computer readable storage medium is not a transitory signal per se. The program instructions are readable by a computer to cause the computer to perform a method including the steps of: (i) receiving a data series comprising a plurality of change points; (ii) identifying a first change point in the data series; (iii) automatically assigning the identified first change point as a starting point for a first data segment; (iv) identifying, using only the data in the first data segment, a second change point in the data series; (v) automatically assigning the identified second change point as a starting point for a second data segment; and (vi) storing the first and second identified change points, and the first and second data segments.

These and other aspects of the invention will be apparent from the embodiments described below.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The present disclosure is directed to embodiments of a method and system for segmenting data. According to an embodiment, the method and system identifies a changepoint in a data series, and uses that identified changepoint as the starting point for a segmentation of the data. Each sequential changepoint is utilized as the starting point for a segmentation of the data. According to an embodiment, the system chunks the data to build the data set from the identified changepoint, until the system identifies the next changepoint.

Figure 1:
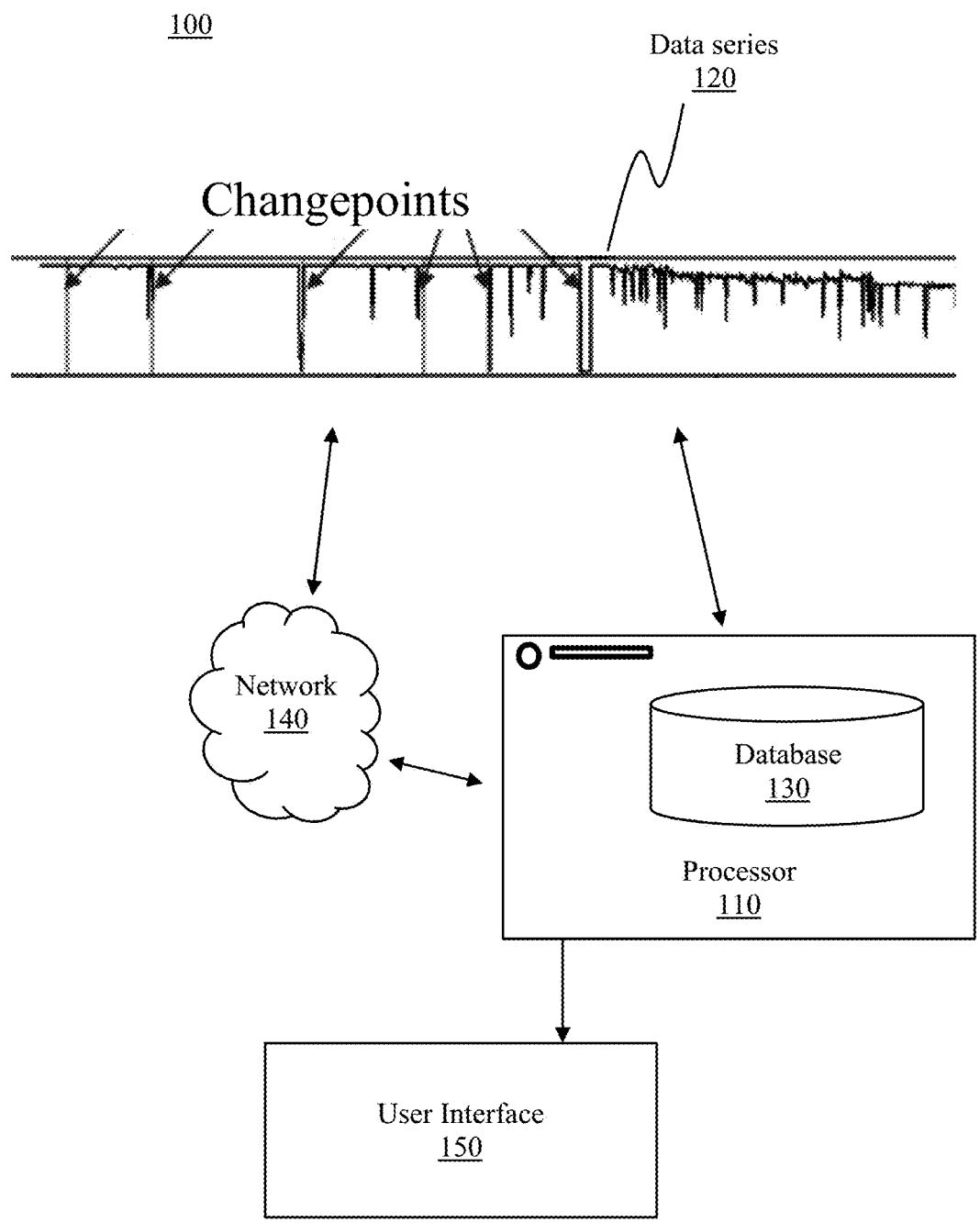
FIG. 1 is a schematic representation of a system for segmenting data, in accordance with an embodiment.

Referring to FIG. 1, in one embodiment, is a system 100 for segmenting data, where the system identifies a changepoint in a data series and uses that identified changepoint as the starting point for a segmentation of the data. According to an embodiment, system 100 comprises a data processing environment comprising a processor 110 configured to receive and/or store a data stream or series 120. The data stream or series can be any sequence of data, preferably including one or more changepoints. For example, the data stream or series can be data such as a signal of any type, temporal data, sequencing information, financial information, stock values, and/or a wide variety of other types of data series and data streams. These are provided as just a small example of a data series or stream, and should not be construed or interpreted to limit the scope of possible data utilized or analyzed by the system.

The processor may comprise, for example, a program or algorithm configured to comprise, perform, or otherwise execute any of the functionality described or otherwise envisioned herein. Processor 110 comprises or is in communication with a database 130 which is configured to store the received data stream or series 120, other information utilized by the processor, and/or output from the processor 110.

According to an embodiment, data processing environment including processor 110 may be in communication with a network 140. Processor 110 may receive information such as the data stream or series 120 from or otherwise access network 140 to receive the data. The wired or wireless communication network 140 can be, for example, the Internet, a LAN, an intranet, cellular network, or any of a variety of other networks. The processor and/or algorithm can then process the accessed or received data according to the methods described or otherwise envisioned herein. According to another embodiment, system 100 may send the received data and/or the processed data to another computer, user, or location via network 140.

According to an embodiment, system 100 also includes a user interface 150. User interface 150 can present, for example, graphical, textual, and/or other visual information to the user. The user interface may also comprise one or more control features, such as a keyboard, computer mouse, and/or touchscreen, to allow the user to control the system. In one embodiment, the user interface 150 is a graphical user interface and may include a display screen or other type of display. For example, the user interface 150 may include a control system that enables the user to change one or more settings of system 100, as well as a graphical output that displays processed data—including changepoints—to the user.

Figure 2:
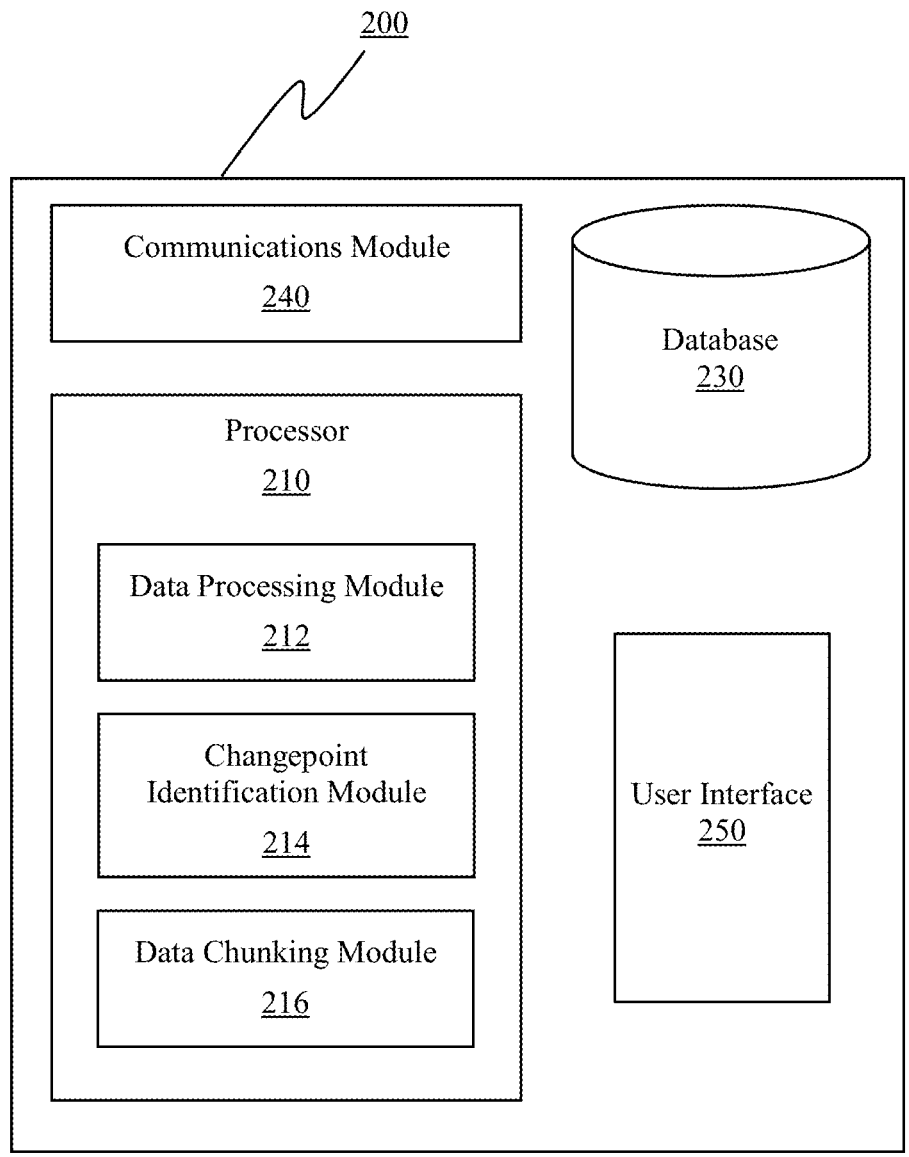
FIG. 2 is a schematic representation of a system for segmenting data, in accordance with an embodiment.

Referring to FIG. 2, in one embodiment, is a computer system 200 for segmenting data, where the system identifies a changepoint in a data series and uses that identified changepoint as the starting point for a segmentation of the data. According to an embodiment, computer system 200 comprises a processor 210 configured to receive and/or store a data stream or series. The data stream or series can be any sequence of data, preferably including one or more changepoints. Processor 210 may comprise, for example, a program or algorithm configured to comprise, perform, or otherwise execute any of the functionality described or otherwise envisioned herein. For example, processor 210 may comprise, for example, one or more programs or algorithms implemented as modules to execute any of the functionality described or otherwise envisioned herein.

According to an embodiment, processor 210 comprises a data processing module 212. Data processing module 212 can be configured to retrieve, receive, and/or store a data stream 120. For example, data processing module 212 may receive a data stream stored in a database 230, or may receive a data stream from a communications module 240. Data processing module 212 may also analyze and/or process the retrieved or received data stream prior to processing by the other modules. The data stream may be isolated, cleaned, or otherwise modified to improve one or more downstream functions, among many other types of data processing.

According to an embodiment, processor 210 comprises a changepoint identification module 214. Changepoint identification module 214 can be configured to identify one or more changepoints in the data stream. Changepoint may be identified by a wide variety of methods, including those described or otherwise envisioned herein. For example, changepoint identification may comprise one or more user-defined or programmed thresholds or parameters. As another example, changepoint identification is at least partially dependent upon the type of data being analyzed, and/or is at least partially dependent upon the data itself.

According to an embodiment, when the changepoint identification module 214 identifies a changepoint in the data, the changepoint identification module 214 automatically updates the starting point for the next data segment to the most recently detected changepoint. According to an embodiment, this ensures that the detection process executed for finding a changepoint is no different whether the entire data set is passed, or a sub-segment that is left-bounded by a changepoint is passed.

According to an embodiment, processor 210 comprises a data chunking module 216. Data chunking module 216 can be configured to chunk or otherwise tag, cluster, identify, or allocate data segmented by the changepoint identification module 214. For example, according to one embodiment, the changepoint identification module 214 identifies changepoints utilized as start and stop points for data segments, and the data chunking module 216 chunks the data within that identified segment for storage, processing, and/or other analysis. The data chunking module 216 can thus create one or more data sets comprising the segmented data.

It is understood that one or more of the modules in computer system 200 can be stored in one or more remote memory storage devices or processors in a distributed configuration (not shown). According to an embodiment, one or more additional or alternative program modules may be used to implement functionality not specifically identified in FIG. 2.

According to an embodiment, computer system 200 comprises or is in communication with a database 230 which is configured to store the received data stream or series, other information utilized by the processor, and/or output from the processor. The computer system may also include a wired and/or wireless communications module 240, which can communicate via, for example, wired Wi-Fi, Bluetooth, cellular, IR, radio, or near field communication, among other communication methods. The communications module 240 can communicate with a network, another computer, a wired or wireless device, and/or any other device.

According to an embodiment, computer system 200 comprises a user interface 250. User interface 150 can present, for example, graphical, textual, and/or other visual information to the user. The user interface may also comprise one or more control features, such as a keyboard, computer mouse, and/or touchscreen, to allow the user to control the system. In one embodiment, the user interface 150 is a graphical user interface and may include a display screen or other type of display.

Figure 3:
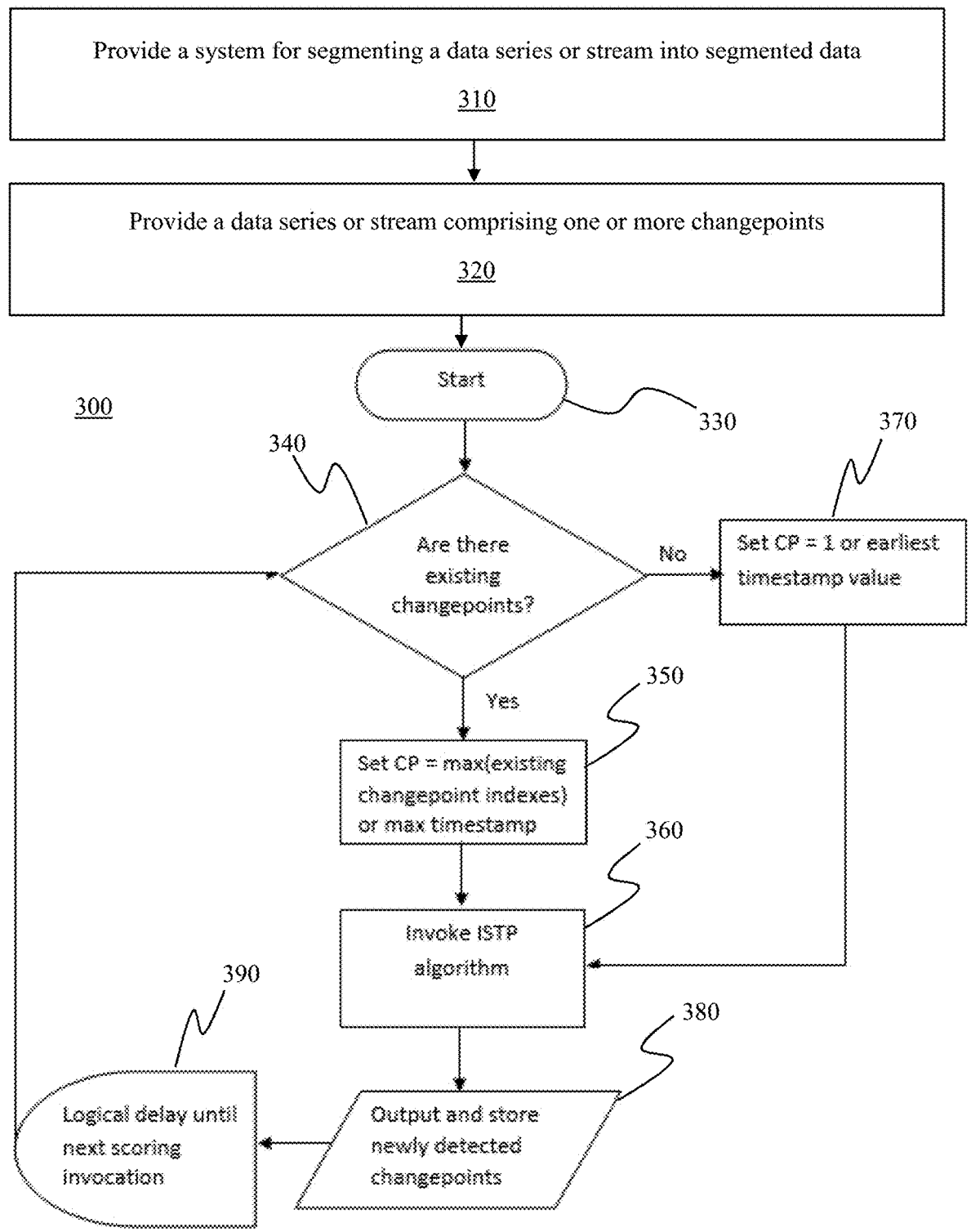
FIG. 3 is a flow chart of a method for segmenting data, in accordance with an embodiment.

Referring to FIG. 3, in one embodiment, is a method 300 for segmenting data. At step 310 of the method, a system for segmenting data is provided. The system may be any of the systems described or otherwise envisioned herein, including but not limited to systems 100 and/or 200, although many other systems are possible. For example, the system may comprise a data stream or series 120 that is created within the system or provided to the system, a processor 110 configured to receive, store, and/or analyze the data stream or series 120, a database 130 which is configured to store the received data stream or series 120 and/or the output of the analysis of the data stream, a network 140, and/or a user interface 150.

At step 320 of the method, a data stream or series 120 is created within the system, is retrieved from storage within the system, or is otherwise received by or provided to the system. The data stream or series can be any sequence of data, preferably including one or more changepoints. For example, the data stream or series can be data such as temporal data, sequencing information, financial information, stock values, and/or a wide variety of other types of data series and data streams. These are provided as just a small example of a data series or stream, and should not be construed or interpreted to limit the scope of possible data utilized or analyzed by the system. According to an embodiment, when the system receives a data stream or series 120, the system treats it as if it has been growing in smaller increments.

At step 330 of the method, the data stream or series 120 is analyzed by the system at START. For example, at step 340 of the method, the system determines whether existing changepoints have been identified. If yes, then the system proceeds to step 350, where a changepoint value (CP) is set at max for existing changepoint indexes, or a max timestamp. Then the system progresses to step 360, where the data stream or series 120 is analyzed by an algorithm such as the ISTP algorithm. If existing changepoints have not been identified, then the system proceeds to step 370, where the changepoint value (CP) is set at 1, or the earliest timestamp value. Then the system progresses to step 360, where the data stream or series 120 is analyzed by a module or algorithm such as the ISTP algorithm.

At step 360 of the method, the data stream or series 120 is analyzed by an algorithm for multiple changepoint detection and data segmentation as described or otherwise envisioned herein. For example, the algorithm may be termed the "Inflationary Segment Temporal Data Partitioning" (ISTP) algorithm. When a changepoint is detected in the input data segment, the starting point for future segments is automatically updated to the most recently detected changepoint. The methodology ensures that the detection process executed for finding a changepoint is no different whether the entire data set is passed, or a sub-segment that is left-bounded by a changepoint is passed. The size of the increment determines the sensitivity of the algorithm and can be user configured. Following is an example of pseudocode describing one embodiment of the methodology of multiple changepoint detection, although many other examples and embodiments are possible:

A set of data of the form $(y_1, y_2, y_3 \ldots y_n)$, $y_i \in \mathbb{R}$
A cost function C
A rejection threshold $\beta$
An inflation factor $\rho < n$, $\rho \in \mathbb{N}$
A set of existing change points $CP-(cp_1, cp_2, cp_3, \ldots cp_k)$, $cp_i \in \{1, 2, \ldots n\}$, $k \leq n$
Initialize:
Let $v=cp_i=\max(CP)$, $CP \neq \emptyset$, else $v=1$
Let $t=v$
Iterate:
While $t \leq n-\rho$,
Let $t=t+\rho$
$\tau = \arg\min_\tau \Gamma(\tau)$,
where $\Gamma = C(y_{v:\tau}) + C(y_{(\tau+1):t})$ is the cost function assuming the presence of a changepoint at $\tau$, and
$\tau \in \{v, v+1, \ldots, t\}$
If $C(y_{v:t}) - (C(y_{v:\tau}) + C(y_{(\tau+1):t})) > \beta$, add $\tau$ to CP and set $v=\tau$
Output:
The set of changepoints CP According to an embodiment, $\beta$ controls the threshold used for changepoint detection. The $\rho$ controls the minimum step taken before rechecking for a changepoint. Smaller values increase computation time, but also outputs smaller partitions and can result in higher sensitivity. Any cost function C can be chosen based on the available data. According to an embodiment, examples of cost functions include the following, although many other examples of cost functions are possible:

1. $C(y_{\tau:s}) = -\max_\theta \Sigma_{i=\tau}^s \log f(y_i|\theta)$, where f is the density function for the data points within the segment
2.

$$C(y_{\tau:s}) = (\tau - s)\left(\log(2\pi) + \log\left(\frac{\sum_{i=\tau}^{s}(y_i - \mu^2)}{s - \tau}\right) + 1\right)$$

According to an embodiment is an example calculation showing the improved performance of a computer system analyzing a data stream when implementing the methods described or otherwise envisioned herein. In this example, a computer system comprises data obtained by equipment having multiple different sensors. The data is aggregated at 1 hour intervals, with historical data available for the last 5 years. On average, the number of changepoints increases linearly with the size of the data, with one mode change occurring every 200 interval points on average.

For traditional binary segmentation, the number of data points per sensor required to be processed by existing algorithms=n=43,800. The computational complexity of even the more efficient algorithms such as Binary Segmentation is in the order of O (n log n), and n log n translates to 675,336.

In contrast, when utilizing the methodology described herein, the number of data points per sensor required to be processed (max average)=n=200. The computational complexity is in the order of O (n/ρ), where ρ is the inflation factor. For an inflation factor of 10, n/ρ translates to 20. As a result, the methodology described herein significantly improves the functionality, speed, and efficiency of the processor. For example, in the above sample scenario, traditional segmentation methods must process 219 times more data than the method described herein, because it processes significantly more historical data, among other variables. Accordingly, the computational complexity of traditional segmentation methods is 33,766 times that of the method described herein.

At step 380 of the method, the newly-identified changepoints are output and/or stored by the system. For example, the system may store the newly-identified changepoints in the database 130. As another example, the system may communicate the newly-identified changepoints via network 140, and/or may provide the newly-identified changepoints to a user or other output via user interface 150.

At step 390 of the method, there can be a delay until a next scoring invocation from a user, from the system, or from some other source.

Figure 4A:
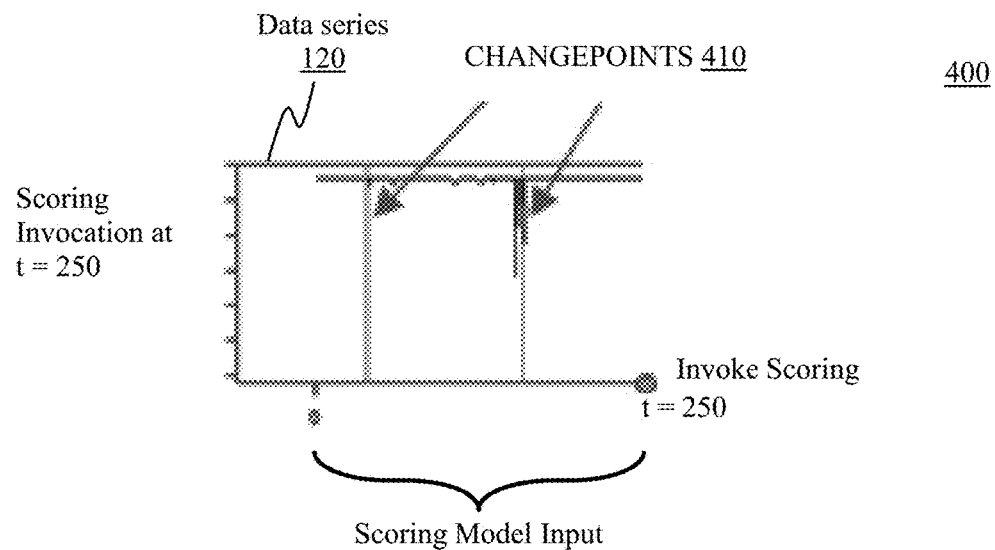
FIG. 4A is a schematic representation of a method for changepoint identification and data segmentation, in accordance with an embodiment.
Figure 4B:
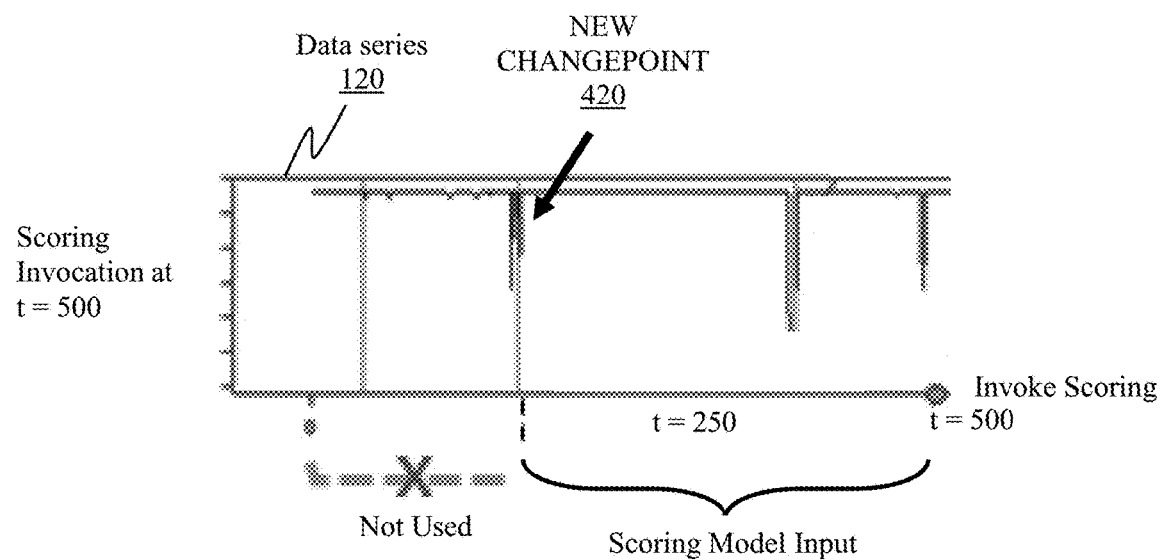
FIG. 4B is a schematic representation of a method for changepoint identification and data segmentation, in accordance with an embodiment.

Referring to FIGS. 4A and 4B are a schematic representations of data segmentation system or method 400 utilizing the methods described or otherwise envisioned herein. Data series or stream 120 comprises one or more changepoints 410. The data series or stream 120 continues in FIG. 4B, where new changepoint 420 is discovered. New changepoint 420 is identified by the system as the start of a new data segment, rather than at t=0 for every segmentation and changepoint identification.

The methods described or otherwise envisioned herein overcome the drawbacks of existing changepoint detection algorithms. For example, the methods provide consistency for detection of changepoints even with sub-segments of a data series. Some of the advantages of the methods described or otherwise envisioned herein include: (i) scalability, since the scoring model performance is not compromised as more data is assimilated; (ii) consistency, since the method yields consistent results even with sub-segments of the original data as long as it is left bounded by a changepoint; and (iii) robustness, as the method does not become sensitive to detecting changes/fluctuations if scoring is invoked repetitively on incremental segments of the data. Further, the methodology ensures that the detection process executed for finding a changepoint is no different whether the entire data set is passed, or a sub-segment that is left-bounded by a changepoint is passed. For example, the size of the increment determines the sensitivity of the algorithm and can be user configured.

Some embodiments of the present invention may include one, or more, of the following features, characteristics, advantages and/or operations: (i) avoids drawbacks of any algorithms where the changepoints detected in the past may start changing as more data accumulates such that these algorithms may be insufficient for practical applications because they will invalidate what was already discovered or known, in essence contradicting themselves; (ii) progressively chunks the data in growing increments; and/or (iii) repeatedly checks for changepoints.

Some embodiments of the present invention may include one, or more, of the following features, characteristics, advantages and/or operations: (i) detects of singular changes in small segments of the time series data starting from the last known changepoint; (ii) the segments are progressively inflated until the end of the data is reached or a new change is detected; (iii) if a new change is detected, the segments are built again, with the newly detected change as the starting point; (iv) avoids need to perform model scoring on time series data that is routinely updated with new information; (v) mimics the scoring invocation process at a relatively granular level; (vi) whenever a whole data segment is passed to the algorithm, algorithm treats the data segment as if it has been growing in smaller increments; (vii) checks for changepoints by slowly growing this segment in each iteration; and/or (viii) when a changepoint is detected in the input data segment, the starting point for future segments is automatically updated to the most recently detected changepoint.

Some embodiments of the present invention may include one, or more, of the following features, characteristics, advantages and/or operations: (i) ensures that the detection process executed for finding a changepoint is no different whether the entire data set is passed, or a sub-segment that is left-bounded by a changepoint is passed; (ii) the size of the increment determines the sensitivity of the algorithm and can be user configured; (iii) handles the problem of identifying the time domain patterns in big data based on statistical parameters and finding the check-points such that the patterns determined until a point need to be invariant even as the time sequence length increases as new data comes in; (iv) avoids the need to recompute the patterns with the data from start so that change points or check points change due to the influence of the new data (especially where there exists another class of problems where in the historical data only from the prior change point is needed as at that change point some decisions could have been made and so the data from that point could be different in characteristics compared to the data to that point); (v) uses data chunking to build the data set from prior change point until the parameters show distinct change marking the next change point; (vi) only historical data from a previous changepoint is required and used; (vii) provides the benefit of scalability; and/or (viii) provides historical consistency and robustness aspects arising of the ISTP algorithm.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for segmenting a data series, the method comprising:
    receiving a data series comprising a plurality of changepoints;
    analyzing, by a processor, the received data series sequentially, comprising:
    identifying a first change point in the data series;
    automatically assigning the identified first changepoint as a starting point for a first data segment and a starting point for the data series;
    identifying, using only the data in the first data segment, a second changepoint later in the data series, wherein identifying the second change point comprises generating a checkpoint detection score based on a data series cost function and an inflation factor; and
    if the checkpoint detection score is above a threshold automatically assigning the identified second change point as a starting point for a second data segment and a new starting point for the data series;
    progressively chunking the data in each of the first and second data segments in growing increments; and
    storing, in a database, the first and second identified change points, and the first and second data segments.

2. The method of claim 1, wherein the first changepoint is the start of the received data series.

3. The method of claim 1, further comprising:
    receiving, from a user, a parameter for changepoint identification.

4. The method of claim 1, further comprising: communicating the first and second identified change points, and the first and second data segments, to a user.

5. A computer system configured to segment a data series, the system comprising:
a processor configured to:
identify a first change point in the data series;
automatically assign the identified first change point as a starting point for a first data segment and a starting point for the data series;
identify, using only the data in the first data segment, a second change point later in the data series, wherein identifying the second change point comprises generating a checkpoint detection score based on a data series cost function and an inflation factor; and
if the checkpoint detection score is above a threshold progressively chunk the data in each of the first and second data segments in growing increments; and
automatically assign the identified second change point as a starting point for a second data segment and a new starting point for the data series; and
a database configured to store the first and second identified change points, and the first and second data segments.

6. The computer system of claim 5, wherein the first changepoint is the start of the received data series.

7. The computer system of claim 5, wherein the processor is further configured to receive, from a user, a parameter for changepoint identification.

8. The computer system of claim 5, further comprising a user interface configured to communicate the first and second identified change points, and the first and second data segments, to a user.

9. A computer program product for segmenting a data series, the computer program product comprising a computer readable storage medium having program instructions embodied therewith, wherein the computer readable storage medium is not a transitory signal per se, the program instructions readable by a computer to cause the computer to perform a method comprising:
receiving a data series comprising a plurality of change points;
identifying a first change point in the data series;
automatically assigning the identified first change point as a starting point for a first data segment and a starting point for the data series;
identifying, using only the data in the first data segment, a second change point later in the data series, wherein identifying the second change point comprises generating a checkpoint detection score based on a data series cost function and an inflation factor; and
if the checkpoint detection score is above a threshold automatically assigning the identified second change point as a starting point for a second data segment and a new starting point for the data series;
progressively chunking the data in each of the first and second data segments in growing increments; and
storing the first and second identified change points, and the first and second data segments.

10. The computer program product of claim 9, wherein the first changepoint is the start of the received data series.

11. The computer program product of claim 9, further comprising the step of receiving, from a user, a parameter for changepoint identification.

12. The computer program product of claim 9, further comprising the step of communicating the first and second identified change points, and the first and second data segments, to a user.

13. The method of claim 1, wherein the received data is time series data and further comprises:
detecting, by the processor, singular changes in segments of the time series data starting from a last known change point.

14. The method of claim 13, further comprising:
progressively inflating the segments of the time series data until an end of the received data is reached or a new change point is detected.

15. The method of claim 14, further comprising the step of:
analyzing the received data with an Inflationary Segment Temporal Data Partitioning ("ISTP") algorithm.

16. The method of claim 15, wherein progressively chunking the received data in growing increments and the size of the increments being chunked determines the sensitivity of the ISTP algorithm toward detecting the second change point.

* * * * *